R. H. McCORMICK.
SCALE INDICATING AND TOTALING MECHANISM
APPLICATION FILED AUG. 25, 1914.
1,131,785.
Patented Mar. 16, 1915.
5 SHEETS—SHEET 1.
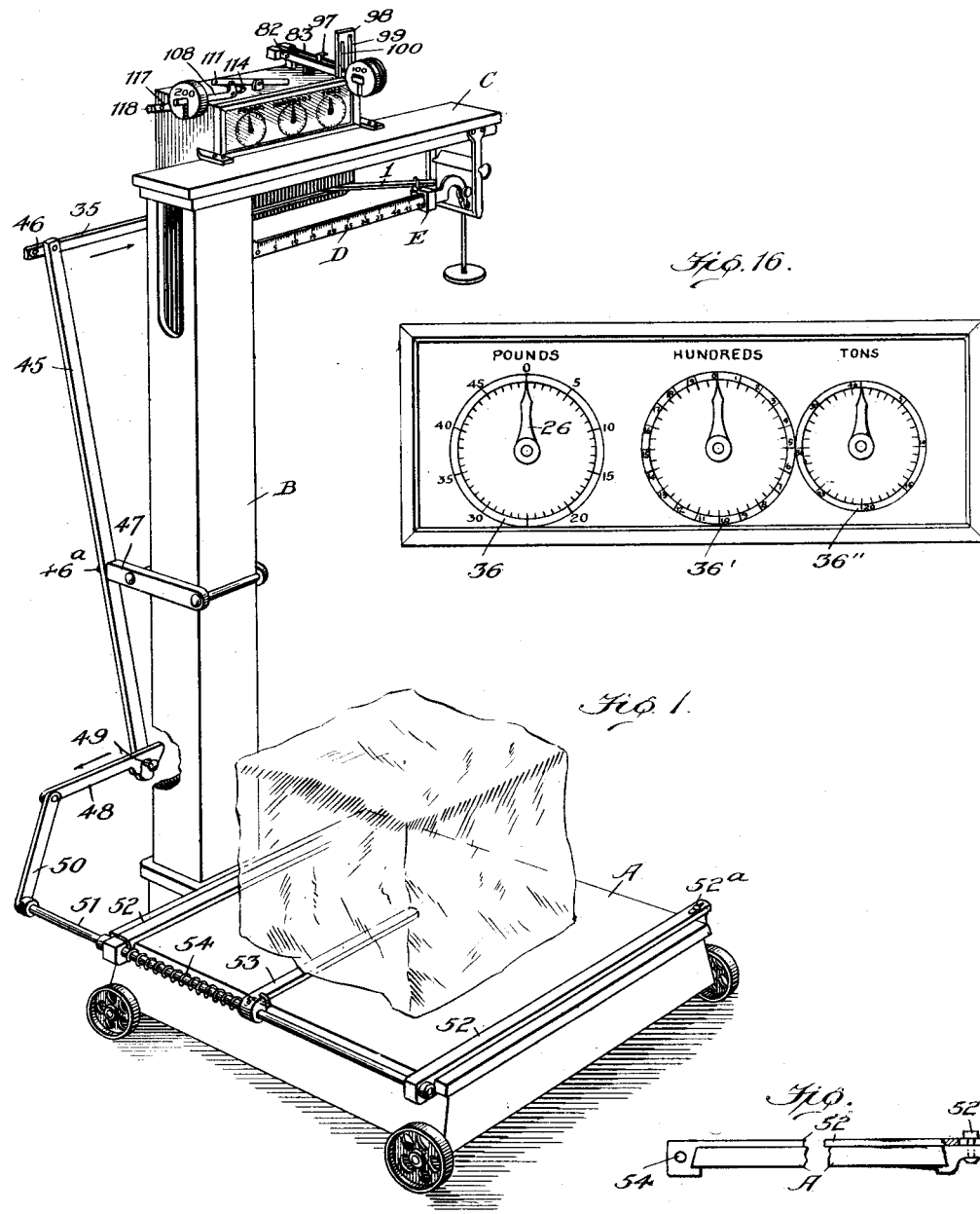

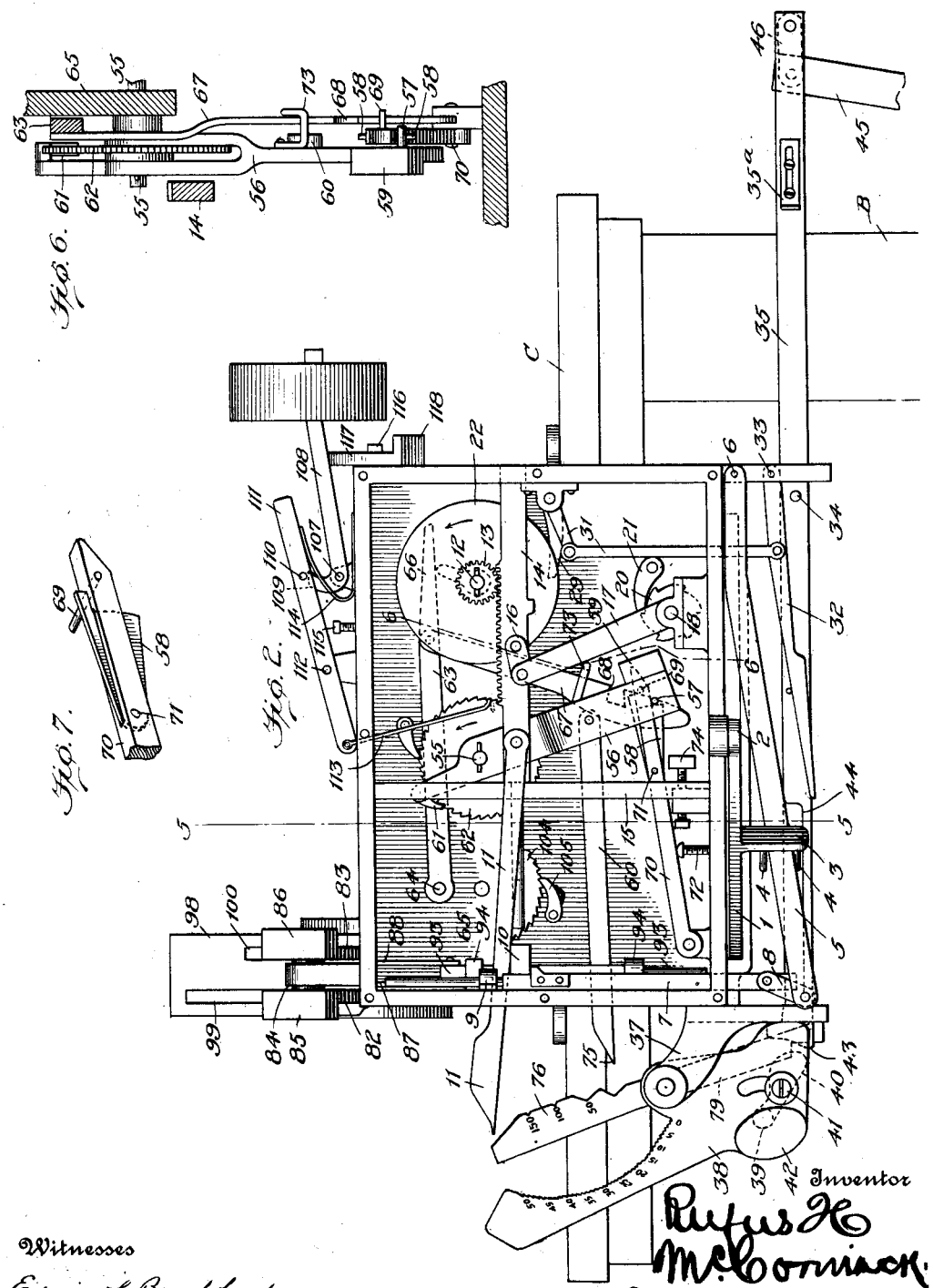

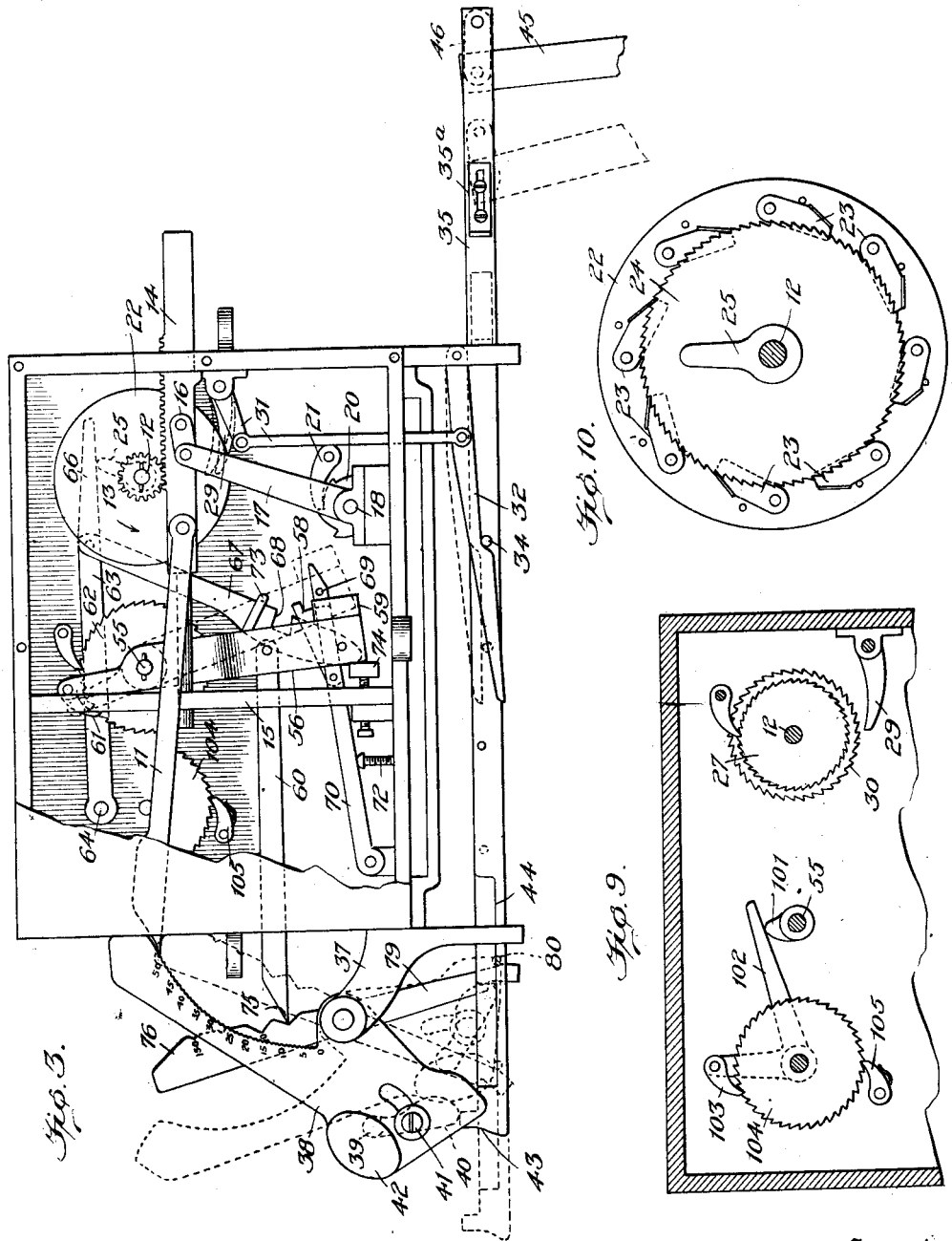

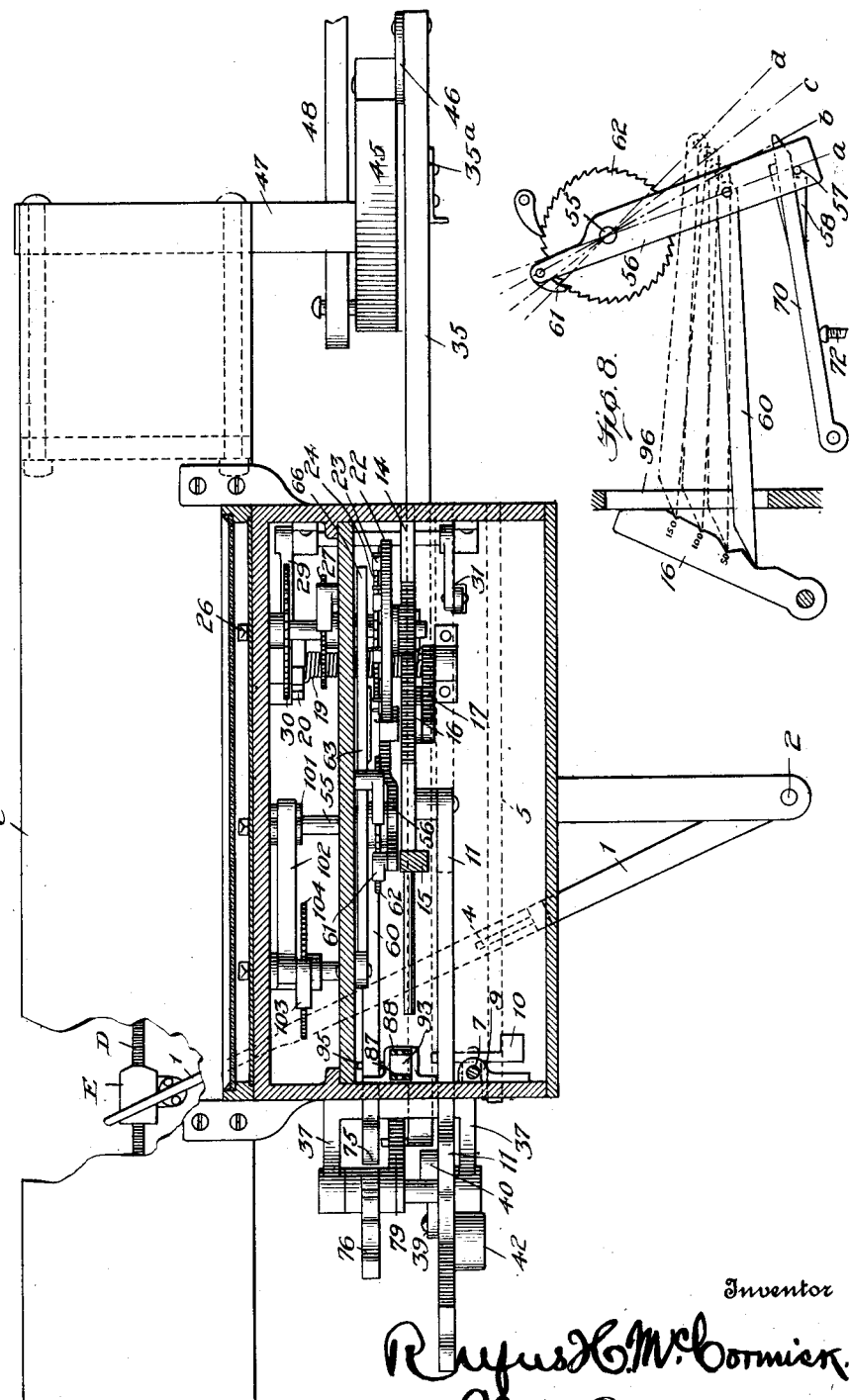

R. H. McCORMICK.
SCALE INDICATING AND TOTALING MECHANISM.
APPLICATION FILED AUG. 25, 1914.
1,131,785.
Patented Mar. 16, 1915.
5 SHEETS—SHEET 5.
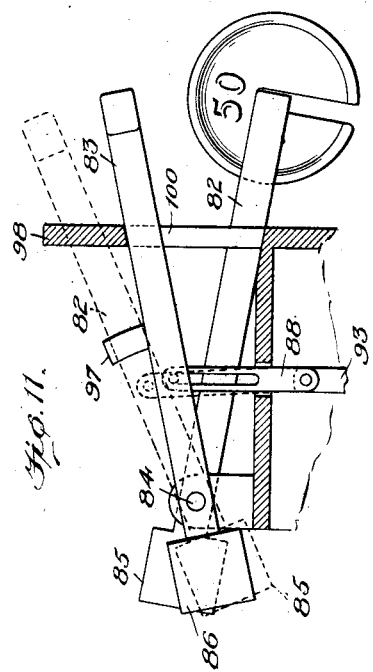
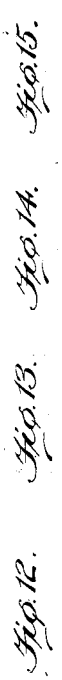
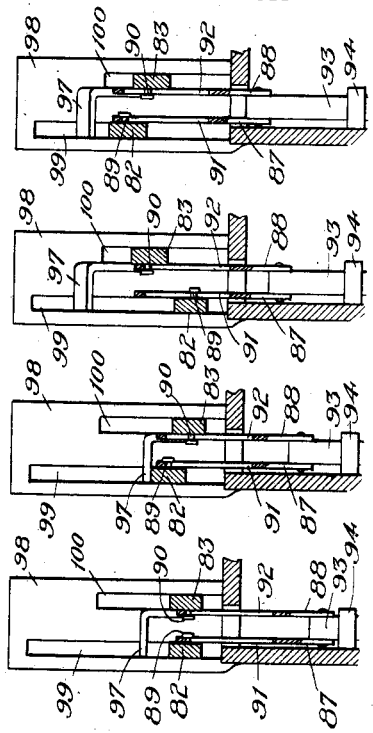
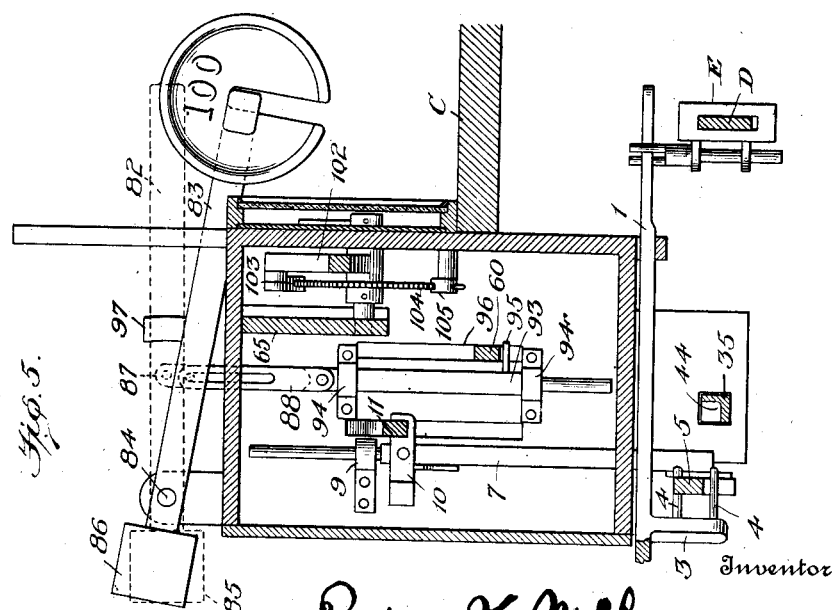

UNITED STATES PATENT OFFICE.

RUFUS H. McCORMICK, OF MARLBROOK, VIRGINIA.

SCALE INDICATING AND TOTALING MECHANISM.

1,131,785.  Specification of Letters Patent. Patented Mar. 16, 1915.

Application filed August 25, 1914. Serial No. 858,457.

*To all whom it may concern:*

Be it known that I, RUFUS H. McCOR-MICK, a citizen of the United States, residing at Marlbrook, in the county of Rockbridge and State of Virginia, have invented certain new and useful Improvements in Scale Indicating and Totaling Mechanism; and I do hereby declare the following to be a full, clear, and exact description of the invention, such as will enable others skilled in the art to which it appertains to make and use the same.

This invention relates to certain new and useful improvements in weighing scales and resides more especially in an indicating and totaling mechanism for use in connection with scales of the platform type.

In calculating the total number of pounds weighed in the ordinary use of this type of scales, it is now necessary to separately note the number of pounds of the respective articles weighed and then by adding these separate notations obtain the total. This method of computing the total is very tiresome and is always susceptible to the inaccuracies which are so frequently prevalent when weighing a large number of articles during the course of a day.

It is the object of this invention to overcome these difficulties now experienced and provide a weighing scale in which the weight of each article is successively indicated and the accumulated weights of the several articles totaled upon indicating dials.

Another object of this invention is the provision of an indicating and totaling mechanism which can be readily applied to an ordinary platform scale whereby the successive weights of the articles are separately indicated and then accumulated in a total.

A further object of this invention is the provision of a weighing scale having an indicating and totaling mechanism which is automatically operated when the article being weighed is removed from the platform.

A still further object of this invention is the provision of a platform scale indicating the provision of a platform scale indicating and totaling mechanism in which the several weights now used in conjunction with the sliding weight or poise on the beam, are capable of being positioned so as to set the mechanism for its proper working when the article weighed is removed.

With these and other objects in view the invention further consists in the novel arrangement and combination of parts hereinafter described and more fully pointed out in the appended claims.

In the drawings: Figure 1 is a perspective view illustrating my improved weighing scales with the mechanism attached thereto and an article on the platform in the course of weighing. Fig. 2 is an enlarged view looking from the rear with the cover plate removed, of the mechanism for effecting the indicating and totaling of the several weights. Fig. 3 is a similar view, but with the parts in an operated position. Fig. 4 is a sectional plan view of the parts shown in Fig. 2. Fig. 5 is a transverse section on the line 5—5 of Fig. 2. Fig. 6 is a detail vertical sectional view of the transfer mechanism on the line 6—6 of Fig. 2. Fig. 7 is a detail view of the tripping pawl or latch. Fig. 8 is a diagrammatical view illustrating the manner in which one of the indicating dials is operated to effect the accumulation of the respective weights. Fig. 9 is a detail view of the ton indicating dial mechanism and the locking means employed for the first indicating dial. Fig. 10 is a detail view of the pawl and ratchet mechanism employed in the rotating of the first indicating dial. Fig. 11 is a detail of the weight levers and the respective operation of each when the weights are removed. Figs. 12, 13, 14 and 15 are detail sectional views through the weight levers, illustrating the several positions when the weights are removed, in order. Fig. 16 is a front view on an enlarged scale of the indicating dials, and Fig. 17 is a detail end view of the clamping means used to secure parts of the mechanism to the scale.

The present invention is primarily designed for use in conjunction with an ordinary platform scale and is preferably attached to the arm overhanging the beam, and further connected to the platform through an operating mechanism as will hereinafter appear. This operating mechanism consists of a system of levers which are set when the article to be weighed is placed upon the platform and its weight properly determined in the usual way, and then designed to operate when the article which has been weighed is removed. Through the operation of these levers the respective weights are registered and totaled by the mechanism and can be observed clearly from the face of the indicating dials.

The weighing of the article is accomplished in the usual way, i. e., by the moving of the weight or poise upon the beam, and then adding such additional weights as may be necessary.

When the weight or poise which slides upon the beam is moved according to the weight of the article on the platform a "setting" of the totaling and indicating mechanism is effected. Likewise the removing of the usual fifty and one hundred pound weights from their normal position, as shown in the drawings, and adding them to the end of the beam effects a "setting" of the totaling and indicating mechanism as will be more fully hereinafter described.

In the drawings the scale consists of a platform A, a metal upright or post B, an overhanging arm C, the usual beam D, and the weight or poise E. These parts are of the ordinary construction and form no part of the present invention except wherein they are shown in combination with the other parts.

The weight or poise E is adapted to slide pon the beam D in the usual manner and has connected thereto one end of an arm 1, which latter is pivoted at 2 upon a suitable support of the totaling and indicating case, see Figs. 4 and 5. This arm when moved operates to "set" the mechanism within the casing, which is secured to the overhanging arm by screws, bolts or the like. To the under side of this arm 1 is secured a depending bracket 3 which is provided with outwardly extending pins 4. Between these pins 4 a lever 5 is positioned, the said lever being pivoted at one end to the casing as at 6, and being also loosely connected at the other end to a vertically moving bar 7 as indicated at 8. See Figs. 2 and 5.

The vertically moving bar 7 is arranged to slide through the bottom of the casing and is further guided by a bracket and bearing 9. To the bar 7 is secured a weighted pawl or lever 10 the purpose of which is to engage the underside of an arm or lever 11, which latter forms a part of the indicating mechanism now to be described. This mechanism is mounted upon the shaft 12 and other parts thereof are in close proximity thereto. Mounted upon the shaft 12 is a pinion 13 adapted to mesh with a horizontally reciprocating rack bar 14. This rack bar 14 is guided through the end wall of the casing and an intermediate partition 15 formed therein. To this bar is pivoted the arm or lever 11 hereinbefore mentioned. Also secured to the rack bar by the link 16 is an arm 17 which is secured to a spring actuated shaft 18. The spring 19 encircling this shaft is secured thereto at one end, and at its other end is secured to a ratchet 20 which is held in adjusted position by the pawl 21. By this construction it will be readily seen that the correct tension can be obtained upon the spring to effect the correct movement of the arm 17. The object of this spring actuated arm is to return the mechanism after it has been operated in effecting a recording of the pounds.

Loosely positioned upon the shaft 12 and secured to the pinion 13 is a disk 22 to which is secured a plurality of pawls 23. The pawls engage the teeth of a ratchet wheel 24 which has fastened to it a cam 25. This said ratchet wheel and cam while adapted to move in unison are secured upon the shaft, and depend wholly upon the pawls carried by the disk for rotation.

Assuming the disk 22 to be rotated in the direction of the arrow in Fig. 3, it will be seen that the pawls 23 will engage the ratchet wheel 24 and thereby rotate the cam 25 for a purpose to be presently described. The return of the pinion disk and pawls is effected by reason of the spring actuated arm hereinbefore described, and in so doing the pawls pass over the ratchet teeth without engaging same, thereby leaving the ratchet wheel and cam in its advanced position. To the outer end of the shaft 12 is secured an indicating hand 26 the purpose of which is to indicate the number of pounds ranging from one to fifty. When the ratchet wheel and cam have been moved to the correct position by the pawls 23, it will be seen that the shaft 12 has been rotated and the hand upon the outer end thereof positioned according to the number of pounds the article weighs, ranging from one to fifty pounds.

In order to prevent the hand from fluttering or possibly indicating the wrong number of pounds, a ratchet wheel 27 and pawl 28 is provided, the purpose of which is to allow the shaft 12 to which the ratchet wheel 27 is secured to move in the direction of the arrow, as shown in Fig. 3; but to arrest it, should there be a tendency to turn backward; and likewise, in order to prevent the hand from turning too far in the direction of the arrow, a checking pawl 29 is provided which is adapted to be brought into engagement with a ratchet wheel 30 through the link connection 31 and the lever 32. This lever 32 is pivoted at 33 and is provided on its under surface with a cam portion which is engaged by a pin 34 carried by the main operating bar 35. This main operating bar 35 receives its motion from the system of levers positioned upon the scale and when moved to the position shown in dotted lines in Fig. 3, has operated the lever 32 and its link connection and in turn the pawl 29, thereby checking the forward movement of the hand upon the indicating dial.

In order to more fully comprehend the operation of the indicating mechanism ranging from one to fifty pounds, as shown upon the first dial 36, the operating mechanism will now be described without reference to its subsequent transfer and totaling. Pivoted to a bracket 37 secured upon the casing is a weighted lever 38. This lever at its upper end is provided with a series of arcuate graduations corresponding and ranging in pounds to graduations provided upon the beam D. At each graduation there is preferably a notch, the purpose of which is to accurately engage the sharp and pointed end of the lever or arm 11. To the other end of the lever 38 is pivoted at 39 a tripping pawl 40. This pawl has a swinging movement with relation to the lever 38, the said movement being determined by the slot and pin connection 41. Referring to Fig. 2 of the drawings the lever 38 is shown in its normal position the weighted portion 42 having returned it so as one end thereof bears upon the end of the casing. In this position the tripping pawl 40 is about to be engaged by the end or nose 43 of the main operating bar 35. A movement of this main operating bar operates the lever 38 through the pawl 40, the notch upon the arcuate shaped upper end of the lever corresponding to the notch at which the weight or poise E has been placed, in the present instance at the end or fifty pound mark engaging the sharp nose or point of the lever, or pivoted arm 11. A continued movement of the main operating bar 35 further moves the lever 38 and it in turn moves the arm 11 and that in turn the bar 14, and an operation of the indicating mechanism takes place through the pinion and rack and ratchet connection; the hand upon the shaft 12 stopping at the number of pounds upon the dial which the article weighs, in the present instance fifty pounds. The upper end of the lever 38 having performed its function of forcing the bar 11 inwardly and effecting an operation of the indicating mechanism, it is now held against further movement by contacting with the side of the casing as shown in Fig. 3.

The main operating bar 35 having a predetermined path of travel, regulated through the system of levers on the scale, and the adjustable stop 35ª secured thereto, continues forward as shown in dotted lines in Fig. 3. In so doing the nose 43 of the main operating bar 35 carries the pawl 40 to ride up and over the end of the said bar and then fall back into a recessed portion 44 of the said bar. As soon as this occurs the lever 38 by reason of its weight assumes the position shown in dotted lines in Fig. 3. It will also be seen that as the main operating bar 35 is retracted the pawl 44 will be lifted by the nose 43 of said bar and the parts set for another operation, as shown in Fig. 2. Thus it will be seen that any number of pounds up to fifty can be readily indicated upon the dial according to the weight of the article as determined by the positioning of the weight or poise E upon the beam D.

The system of levers hereinbefore mentioned for operating the main operating bar 35 will now be described. To the outer end of the said bar 35 is secured one end of a lever 45. The connection as shown, consists of a link 46, but any other suitable connection may be employed. The lever 45 is pivoted at 46 to a bracket 47 which is preferably bolted or clamped to the upright or post B of the scales. To the opposite end of the lever 45 is connected one end of a link 48. This link is hooked over a pin 49 upon the lever 45. The opposite end of the link 48 is connected to a crank arm 50 secured to one end of a cross shaft 51. The cross shaft 51 is secured to the side of the platform of the scale by the clamping bars 52. These bars are provided at one end with a movable clamping jaw secured in place by a bolt 53 and adapted to engage one side of the platform. The other end of the clamping bars are recessed to clamp over the edge of the platform and when the jaws have been adjusted and secured it will be readily seen that the cross shaft to which the clamping bars are secured, is properly positioned and held. Intermediate the clamping bars 52 is an operating bar 53. This bar is secured to the cross shaft, and has fastened thereto one end of a spring 54. The other end of the spring is secured to one of the clamping bars, and as will be obvious operates to swing the arm 53 upwardly.

In the operation of this system of levers, the article to be weighed is placed upon the scale platform so as to carry down the arm 53 against the tension of the spring. As the arm 53 is forced downwardly by the weight of the article it will be seen that the cross shaft 51 will be rotated, the crank in turn moved to the position shown in Fig. 1, and the several other parts set accordingly. After the article has been weighed, it is taken off the platform. As the article is removed, the arm 53 swings upwardly through the action of the spring and the several levers operated in the direction of the arrows shown in Fig. 1. Thus it will be apparent that the main operating bar 35 is actuated every time the weighed article is removed and the indicating is effected as hereinbefore set forth.

The mechanism and its operating system of levers for registering the weight of an article up to fifty pounds having been set forth, the mechanism for transferring each total of fifty pounds to the next registering dial will now be described. It will be understood from the following description that as each fifty pounds is registered upon the first dial the transfer of the same as a unit is effected automatically, and the second dial in turn indicates the said fifty pounds transferred in graduations of fifty pounds each. The total number of graduations upon this second dial is shown as equaling the number of pounds which constitute one ton. Upon the registering of the total number of pounds upon this second dial, the third dial is brought into operation automatically and the ton is indicated thereon, as will hereinafter be described.

Referring to Figs. 2 and 3 the mechanism for transferring each fifty pounds accumulated upon the first dial consists of a combination of levers and latches located around and about the shaft 55. Mounted on this shaft 55 is a swinging weighted lever 56, in the lower end of which is positioned a pin 57, extending into the path of a pivoted latch 58. The purpose of this latch is to hold the swinging lever in the position shown in Fig. 2, against the action of the weight 59 therein. An arm 60 is also pivoted to the swinging lever for a purpose to be later described. To the upper end of this swing lever is pivoted a pawl 61 the purpose of which is to engage the teeth upon the ratchet wheel 62. This ratchet wheel is fastened to the shaft 55 and each tooth corresponds to the several graduations upon the second dial of fifty pounds each.

The associated devices for setting the swinging lever 56 so as to transfer the fifty pounds accumulated on the first dial, consist of an arm 63 pivoted at 64 to a partition 65 of the casing. This arm 63 extends longitudinally of the casing and the end 66 thereof is adapted to be engaged by the cam 25 secured to the shaft 12, hereinbefore described. Intermediate the pivotal point of this arm and the end 66 thereof is pivoted a swinging arm 67. This arm 67 has in its lower end a notch 68 which is adapted to receive a pin 69 carried by another pivoted arm 70. In this arm 70 is pivoted at 71 the latch 58 herebefore mentioned. An adjustable stop 72 is provided for the arm 70 and is adapted to correctly position the said arm with relation to the other parts. In order to more fully comprehend the working of these several parts the operation thereof will now be described:

As the fiftieth pound is registered upon the first dial the cam 25, which has made one revolution, engages the end 66 of the lever 63, thereby raising the same. In the lifting of this arm 63 the swinging arm 67 is also elevated and the pin 69 secured to 70 lever 70 which is in engagement with the notch 68 when the pivoted arm 63 is down and not acted upon by the cam, is momentarily lifted carrying with it the said arm 70. As soon as the arm 70 reaches the point where the latch 58 which is carried thereby clears the pin 57, the swinging lever 56 which has been held by the pin 57, swings into a vertical position because of the weight 59 as shown in full lines in Fig. 3. In the movement of this lever 56 a strap member 73 which is secured to the said lever is brought into operation, and as the lever 56 continues to move into the vertical position the strap 73 engages the pivoted arm 67 and swings it clear of the pin 69 which was positioned in the notch 68 thereof, see Fig. 3. A suitable adjusting stop 74 is provided in the casing and limits the movement of the swinging lever 56 with relation to the swing desired and the other co-related parts. With the several parts in the position shown in Fig. 3 of the drawings, it will be seen that the pivoted arm 60 has been moved outwardly and the nose 75 thereof positioned so as to be engaged by the first notch of a lever 76. In this figure the position of the pawl 61 is also shown as ready to move the ratchet wheel 62 the distance of one tooth when the arm 60 is moved in the direction of the arrow in said figure. As the arm is moved by a mechanism to be described presently the swinging lever 56 will be moved into the position shown in dotted lines in Fig. 3 and in full lines in Fig. 2. It will also be seen that when the pin 57 passes from beneath the latch 58 the said latch will drop and prevent the return of the swinging lever 56 until the next transfer is effected. It will be also obvious that as the first dial again starts to register the next fifty pounds that the cam 25 will rotate and allow the pivoted arm 63 to drop, thereby permitting the lever 67 with the notch 68 therein to also drop and swing outwardly a little until the notch 68 engages the pin 69. From this position the parts will again be moved when the cam 25 again engages the end 66 of the lever 63 in transferring another fifty pounds which has been registered. The mechanism for operating this transferring mechanism after it has been properly "set" is located to one side of the casing and comprises the lever 76 pivoted upon the same shaft as lever 38, the lower end of which is engaged by a pin 80 carried by the main operating bar 35 and the upper end of which is provided with a series of notches adapted to engage the end of the arm 60 according to the position into which it is placed by devices to be presently described. As shown in Figs. 2 and 3, the arm 60 is in its normal position for effecting a transfer of each fifty pounds as it is registered upon the first dial. When the main operating bar 35 is operated as hereinbefore described the pin 80 engages the lower end of the lever 79 and moves the upper end thereof so that the arm 60 is engaged by the lowest notch and the transferring mechanism which has been set, is operated. Unless the accumulated weights equal fifty pounds as registered upon the first dial it will be seen that the transferring mechanism will not be set and the arm 60 operated.

The devices for registering and totaling weights ranging from fifty to one hundred and fifty pounds will now be described. This mechanism is used when the articles to be weighed are above the fifty pounds weight or poise on the beam. The fifty and one hundred pound weights are here shown, but it will be understood that other proportionate weights and graduations may be employed as the case requires, the other mechanism being relatively proportioned to cooperate therewith.

In Figs. 5, 8 and 11 to 15 inclusive, the devices for setting the lever 60 according to the weight of the article over fifty pounds, are shown. They comprise the usual fifty and one hundred pound weights mounted upon the end of the levers 82 and 83, respectively. These levers 82 and 83 are pivoted at 84 in suitable supports upon the casing and are provided with weights 85 and 86 which are adapted to elevate the ends of the levers from which the weights have been taken. Loosely secured to each of the levers are links 87 and 88. The connection consists of pins 89 and 90 extending from the levers and working in slots 91 and 92 of the respective links. The lower ends of the links are connected to a bar 93 adapted to move up and down in bearings 94 provided in the end of the casing. This vertically arranged bar 93 carries near its lower end an outwardly projecting pin 95 the purpose of which is to support the pivoted arm 60 and raise and lower said arm through the opening 96 provided in the end of the casing when the fifty and one hundred pound weights are used.

Assuming the article to weigh approximately one hundred pounds, the fifty pound weight is taken off the lever 82 and placed weight is taken off the lever 82 and placed upon the end of the beam of the scale in the usual manner. When this weight is removed the weight 85 upon the opposite end moved the weight 85 upon the opposite end of the lever 82 forces the lever into the air as shown in dotted lines in Fig. 5. The lever moves upwardly until arrested by a stop 97 carried on the lever 83. In so doing the link 87 is brought into operation and the vertically arranged bar 94 moved upward. As this bar rises the pin acting upon the arm 60 causes it to lift until the end thereof is opposite the second notch in the lever 76 or the fifty pound mark, see the first dotted line position in Fig. 8. When in this position it will be readily seen that the fifty pound weight which has been removed operates to set the totaling mechanism so that when the lever 76 forces the arm 60 inwardly, the swinging lever 56 will move a distance equal to one notch or fifty pounds as shown from $a$ to $b$, in addition to the distance it moves when transferring the accumulated fifty pounds from the first dial.

Referring again to Figs. 11 and 15, and assuming the article to weigh approximately fifty pounds more or one hundred and fifty pounds, the fifty pound weight is returned to its proper place upon the lever 83, and the one hundred pound weight taken off of the lever 82. The effect of this is to elevate the arm 60 by reason of the connection described, and set the totaling mechanism so that the lever 76 will engage the third or one hundred pound notch, and thereby cause the swinging lever 56 to travel a tooth farther, or register one hundred and fifty pounds, or the distance from $a$ to $c$, Fig. 8.

Assuming now that the article to be weighed is approximately two hundred pounds, the fifty pound weight is removed, and placed upon the beam, the one hundred pound weight having been removed already and placed upon the beam. When the fifty pound weight is removed the lever 83 is forced upwardly and is again arrested by the stop 97, thereby assuring the proper proportional elevation of the arm 60, (see Fig. 11), into the path of the fourth or one hundred and fifty pound notch of the lever 76, as shown in dotted lines in Fig. 8. When in this position the arm 60 is in the last position shown in dotted lines in Fig. 8 and is set to move the swinging lever 56 a distance of three notches or from $a$ to $d$, in addition to the one tooth moved in the transfer from the vertical position to the point $a$. A guiding member 98 having slots 99 and 100 is secured to the casing and serves to assist the levers 82 and 83 in their movements. The uppermost part of the slot 100 is adapted to arrest lever 83 when the weight is removed, and the stop 97 is designed to stop the upward travel of the lever 82, as will be seen in Figs. 12 to 15. Thus it will be seen that the transferring of the fifty pounds as registered upon the first dial is effected through the swing of the lever 56 so as to turn the second dial one graduation, or from the vertical position to the point $a$; and the additional number of pounds in the fifty and one hundred pound weight further provided for by its moving the distances a—b; a—c and a—d, or a distance of three additional teeth.

As shown in the drawing the second dial is arranged in graduations of fifty pounds each, totaling in all one ton, and in order that each ton may be indicated upon the third dial, a cam 101 is secured to the shaft 55 which, when the said shaft carrying the ratchet wheel 62 makes one revolution, operates one end of a lever 102 and through a pawl 103 carried on the other end of said lever turns a ratchet wheel 104 one tooth or a distance equal to one ton upon the third dial, as will be readily understood. See Fig. 9. A holding pawl 105 is provided beneath the toothed wheel 104 and prevents any overthrow movement of the dial.

In the designing of this present mechanism an additional two hunderd pounds may be registered and further accumulated. This is effected through a mechanism located upon the top of the casing and operated manually by the person operating the scales. Pivotally mounted at 107 is a lever 108 upon one end of which is normally positioned a two hundred pound weight of the usual type. The opposite end of the said lever is curved upwardly as at 109 and terminates beneath a pin 110. The pin 110 is carried by a band lever 111 pivoted at 112 to a suitable support. To one end of the lever 111 is connected a link pawl 113 which is adapted to extend into the casing and engage and operate the ratchet wheel 62. A spring 114 bears against the under side of the band lever to return the same after being operated, and an adjustable stop 115 is secured to the casing for limiting the downward movement of the lever, so as to allow it to move the correct distance.

Pivoted to the end of the casing at 116 is a lever 117 having a counterweight 118 on one end thereof. The other end extends upwardly into the path and bears against the lever 108. Assuming the object to be weighed exceeds the two hundred pounds hereinbefore provided for, the two hundred pound weight is removed from the lever 108 and positioned upon the end of the beam with the other weights. When the weight is removed the counterweighted lever 117 is operated and the curved end of the lever 108 is moved from under the pin 110. The band lever is then operated manually so as to register two hundred pounds on the second dial. As shown herein the band lever is forced downwardly twice, each operation thereof registering one hundred pounds, or a distance equal to two teeth of the ratchet wheel 62. Each tooth representing one graduation upon the second dial or fifty pounds, it will be seen that a distance equal to four teeth of the ratchet wheel will be indicated.

While I have shown herein graduation based upon units of fifty pounds and the general relation and proportion thereto maintained throughout, it is understood that many variations of the units desired may be resorted to, and such other and further details, arrangements and combinations thereof practised as will fall within the scope of the claims.

From the foregoing it will be obvious that I have provided an efficient indicating and totaling mechanism capable of accurately determining the successive weights of many articles. It will also be apparent that the many conditions and circumstances arising in the course of practical use have been provided for, and means employed to properly obtain the desired results.

What I claim is:

1. A weighing scale of the class described comprising in combination a totalizing mechanism, means connecting the said mechanism to the indicating means of the said scale and means including a plurality of levers for operating the totalizing mechanism, the said levers being pivotally mounted upon the totalizing mechanism and interconnected therewith so as to be relatively moved by a predetermined manipulation of the weighing mechanism of the scale.

2. A weighing scale of the class described comprising in combination a totalizing mechanism, means connecting the said mechanism to the indicating mechanism of the said scale, and means comprising a plurality of levers mounted upon the platform and upright of said scale for operating the totalizing mechanism, the said levers being pivotally connected to the totalizing mechanism whereby the article to be weighed when placed upon the platform moves the said levers in one direction, and when removed from the said platform after having been weighed operates the said levers in the opposite direction thereby effecting the operation of the totalizing mechanism.

3. A weighing scale of the class described comprising in combination a platform and beam indicator, a totalizing mechanism, means connecting the said totalizing mechanism to the said beam indicator of the scale and means coöperatively related to said platform for operating the totalizing mechanism.

4. A weighing scale of the class described comprising in combination a totalizing mechanism, means connecting the said totalizing mechanism to the indicator of the scale and means mounted on said scale for operating the totalizing mechanism including a spring-actuated lever interconnected with the totalizing mechanism and operated by the article to be weighed.

5. A weighing scale including in combination a weighing mechanism comprising a platform and beam, a totalizing mechanism connected to the said beam, said totalizing mechanism comprising a plurality of interconnected registering devices and means connecting the said totalizing mechanism with the platform of the scale whereby the weight of an article will be registered when the article is removed from the platform.

6. A weighing scale of the class described including in combination a beam, a weight movable upon said beam, a totalizing mechanism connected to the said weight, additional weights for use upon the end of said beam operatively connected to said totalizing mechanism, the said totalizing mechanism being designed to be set when the weight is moved upon the beam and the additional weights are affixed to the end of the beam in the process of weighing, and means for operating the said totalizing mechanism.

7. A weighing scale of the class described including in combination a beam, a weight movable upon said beam, a totalizing mechanism connected to the said weight, additional weights mounted upon levers interconnected with the totalizing mechanism, the said totalizing mechanism being designed to be set when the weight is moved upon the beam and the additional weights removed from the levers and affixed to the end of the beam in the process of weighing, and means for operating the said totalizing mechanism.

8. A weighing scale of the class described including in combination a totalizing mechanism connected to the indicating beam of the scale, the said totalizing mechanism comprising a plurality of shafts, devices secured to and associated with the said shafts for effecting a transfer of the total successively, a plurality of levers interconnected with and adapted to operate said devices and means for operating said levers including a weighted lever provided with graduations corresponding to those upon the indicating beam of the weighing mechanism.

9. A weighing scale of the class described including in combination a totalizing mechanism the said mechanism comprising a plurality of shafts having registering hands thereon, devices secured to and associated with the said shafts to move the hands successively and means including a plurality of levers connected to the said devices and the weighing scale for operating the hands.

10. A weighing scale of the class described including in combination a totalizing mechanism, means connecting the said totalizing mechanism to the indicator of said scale, devices in said totalizing mechanism for positioning the parts therein, said devices consisting of the weights of the scale used on the beam and a plurality of levers interconnected with the totalizing mechanism and adapted to receive the said weights, and mechanism for actuating the said devices.

11. A weighing scale of the class described including in combination a totalizing mechanism, the said totalizing mechanism comprising a plurality of shafts having toothed wheels, a series of pivotally mounted levers interconnected with the toothed wheels and with each other, another series of levers carrying the additional weights of the weighing scale and interconnected with the first mentioned series of levers for operating the same when the weights are removed, devices secured to and associated with the said shafts and first mentioned series of levers including a cam for operating and releasing some of the first mentioned interconnected levers, and means for operating the toothed wheels.

12. A weighing scale of the class described including in combination a totalizing mechanism, the said totalizing mechanism comprising a series of pivotally mounted levers interconnected with each other, a second series of levers carrying the additional weights of the weighing mechanism and interconnected with the first mentioned series of levers, means provided on the said second series of levers for operating the same when the weights are removed, another series of pivoted levers mounted upon the said totalizing mechanism and adapted to engage some of the first mentioned series of levers, and means for operating the last mentioned levers.

13. A weighing scale of the class described including in combination a totalizing mechanism, the said totalizing mechanism comprising a series of pivotally mounted levers interconnected with each other, a second series of levers carrying the additional weights of the weighing scale and interconnected with the first mentioned levers, means provided on the second series of levers for operating the same when the weights are removed, another series of pivoted levers mounted upon the totalizing mechanism and adapted to engage some of the first mentioned levers, the last mentioned series of levers being graduated in conformity with the graduations upon the indicating beam of the said weighing scale and the additional weights employed, and means for operating the said last mentioned levers.

14. A weighing scale of the class described including in combination a totalizing mechanism, means connecting the said totalizing mechanism to the indicating mechanism of the said scale, means for operating the said totalizing mechanism and means controlled by an additional weight for operating said totalizing mechanism.

15. A weighing scale of the class described including in combination a totalizing mechanism, means connecting the said totalizing mechanism to the indicating mechanism of the said scale, means for operating the said totalizing mechanism and means controlled by an additional weight including a lever for operating the said totalizing mechanism.

In testimony whereof I affix my signature, in presence of two subscribing witnesses.

RUFUS H. McCORMICK.

Witnesses:
J. L. LYNN,
W. L. McCORMICK.

Copies of this patent may be obtained for five cents each, by addressing the "Commissioner of Patents, Washington, D. C."